United States Patent [19]
Lange

[11] Patent Number: 5,485,760
[45] Date of Patent: Jan. 23, 1996

[54] BALL NUT AND SCREW ASSEMBLIES AND METHODS OF ATTACHING EXTENSIONS OR HOUSINGS TO THE BALL NUTS THEREOF

[75] Inventor: David A. Lange, Bay City, Mich.

[73] Assignee: Thomson Saginaw Ball Screw Company, Inc., Saginaw, Mich.

[21] Appl. No.: 240,132

[22] Filed: May 10, 1994

[51] Int. Cl.⁶ .................................................. F16H 25/22
[52] U.S. Cl. ................................ 74/459; 74/424.8 NA; 74/586; 92/33; 403/3
[58] Field of Search .................... 74/89.15, 424.8 R, 74/424.8 NA, 459, 586; 29/401.1; 403/3; 92/33

[56] References Cited

U.S. PATENT DOCUMENTS

| | | | |
|---|---|---|---|
| 2,166,106 | 7/1939 | Gormley | 74/459 |
| 2,765,024 | 10/1956 | Brundage | 74/424.8 NA |
| 2,803,146 | 8/1957 | Brundage | 74/424.8 NA |
| 3,643,521 | 2/1972 | Nilsson | 74/459 |
| 4,053,167 | 10/1977 | Jelinek | 277/165 |
| 4,074,585 | 2/1978 | Richaud et al. | 74/424.8 R |
| 4,841,796 | 6/1989 | Teramachi | 74/459 |
| 4,934,203 | 6/1990 | Bailey et al. | 74/89.15 |
| 4,962,674 | 10/1990 | Payne | 74/89.15 |
| 5,012,687 | 5/1991 | Hoshide | 74/89.15 |
| 5,013,164 | 5/1991 | Tsukada | 74/424.8 R X |
| 5,069,081 | 12/1991 | Morita | 74/89.15 X |
| 5,094,118 | 3/1992 | Morita | 74/89.15 X |
| 5,121,647 | 6/1992 | Teramachi | 74/89.15 |
| 5,199,169 | 4/1993 | Bonzak | 74/424.8 R X |
| 5,287,762 | 2/1994 | Bonzak | 74/424.8 R |

Primary Examiner—Allan D. Herrmann
Attorney, Agent, or Firm—Learman & McCulloch

[57] ABSTRACT

A ball nut and screw assembly with a screw having exterior helical ball carrying groove portions separated by land portions and a co-axial nut having complemental, helical interior ball carrying groove portions separated by land portions with the same lead as said screw groove and land portions has, an end attachment for the nut with a reduced diameter sleeve extending axially therefrom. The sleeve has helical exterior thread portions, of the same lead as the nut groove portions, which are of a matching configuration and are threaded into one end of the nut. The sleeve has an interior diameter which receives and passes the screw without interacting with the screw. A recirculating train of load bearing balls is accommodated within nut and screw groove portions which are axially spaced from the sleeve.

10 Claims, 1 Drawing Sheet

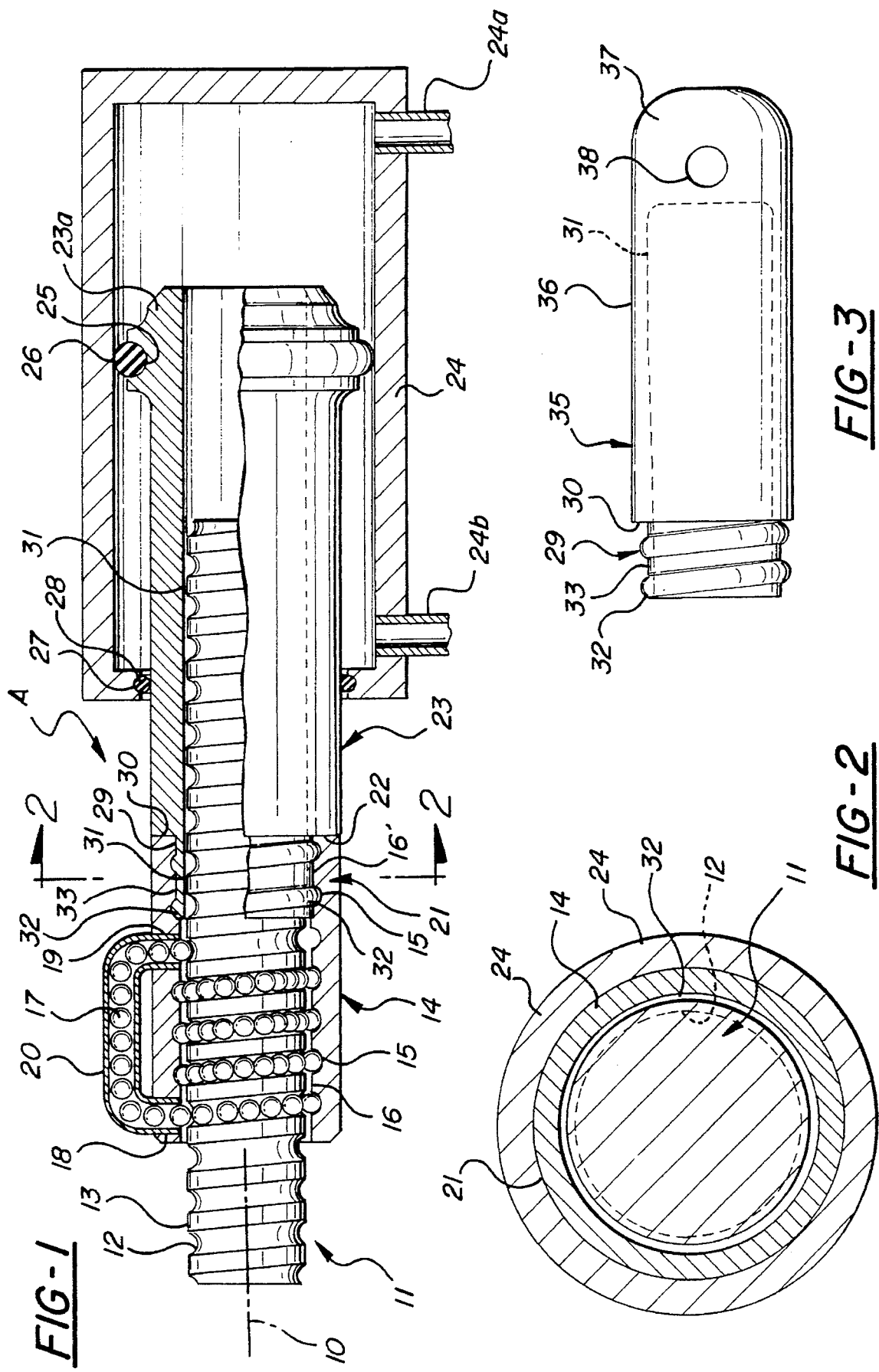

5,485,760

BALL NUT AND SCREW ASSEMBLIES AND METHODS OF ATTACHING EXTENSIONS OR HOUSINGS TO THE BALL NUTS THEREOF

BACKGROUND OF THE INVENTION

The present invention relates to ball nut and ball screw assemblies which incorporate ball nut attachments of one kind or another. Historically, exterior V-threads have been provided on one end of the nut to facilitate attachment, and the attachment has been provided with an opening having matching interior threads which enable the attachment to be received by the threads provided on the exterior of the nut.

For smoothness of operation, attainment of predicted life, and the elimination of potential binding due to side loading or moment loading on the ball screw, due to loads applied to the attachment, it has historically been necessary to tightly control the geometric tolerancing of the attachment element all the way back to the ball circle diameter. This was necessary because the longevity and smooth action of a ball screw is governed by the coaxiality of the applied load axis and the ball circle diameter centerline. The ball circle diameter may be described as the diameter of an imaginary cylinder, the surface of which passes through the centers of all of the load bearing balls in the helical screw groove.

The present invention, inter alia, is characterized by its elimination of this need to control the stack-up of tolerances in the assembly components which necessitated more precision machining and consequent expense.

SUMMARY OF THE INVENTION

The present invention solves this tolerance control problem by providing the attachment with an axially projecting sleeve having helical exterior threads of the same lead and form as the interior ball nut grooves, which can be threaded into an end portion of an extended length nut in which the train of recirculating balls does not operate.

It is a prime object of the present invention to provide a system in which the exterior of the nut need not be formed with threads having the precision necessary to concentrically conform with the ball circle diameter, and the nut attachment need not also be provided with interior threads which are precision manufactured to conform to the nut exterior threads.

Another object of the invention is to secure tolerance control in a system of the character described via the ball accommodating helical groove which is provided on the nut to accommodate balls, since the attachment may, for practical purposes, be said to occur on the ball circle diameter.

Still a further object of the invention is to eliminate the step of precision machining an attachment V-thread on the exterior surface of the nut in the nut machining operation.

Another object of the invention is to provide an actuator system which operates smoothly and reliably to transfer load from the attachment to the ball nut.

Still another object of the invention is to provide a system of the character described in which loading, which imposes an axial thrust load or load component on the nut, is transferred directly to the end wall of the nut.

Other objects and advantages of the invention will become apparent with reference to the accompanying drawings and the accompanying descriptive matter.

BRIEF DESCRIPTION OF THE DRAWINGS

FIG. 1 is a partly sectional, elevational view showing a typical end attachment for the nut which, as portrayed, is the piston of a cylinder;

FIG. 2 is a transverse sectional view on an enlarged scale taken on the line 2—2 of FIG. 1; and FIG. 3 is a side elevational view of another form of ball nut attachment.

GENERAL DESCRIPTION OF THE PARTS

Referring now more particularly to the accompanying drawings, the actuator assembly of the present invention has a typical ball screw 11 provided with helical ball accommodating groove portions 12 separated by land portions 13. Coaxially provided on the screw 11 is a ball nut, generally designated 14, which has matching internal groove portions 15 of the same pitch or lead as the groove portions 12, and which are separated by helical land portions 16.

While the system is depicted as a single lead system, clearly, a multiple lead system could be employed.

Provided in the nut to recirculate the train of abutting load bearing balls 17 which travel in the grooves or groove portions 12 and 15 are the ball passages or bores 18 and 19. In the present instance, the ends of a generally U-shaped external ball return tube 20 are received in the passages 18 and 19 to recirculate the balls 17. It is to be understood that the ball return member 20 need not be external and, alternatively, could take the form of an internal passage machined internally in the wall of the nut.

The nut, at the time of fabrication, is provided with an extension portion, generally designated 21, which is machined, at the time of nut machining, with the same internal helical groove portions 15 and land portions 16, with the land portions 16, however, being cut back slightly as at 16' to increase the diameter of the bore through this portion 21. The end wall of nut portion 21 is machined with a radially extending surface 22 extending radially to the axis 10 of screw 11 and nut 14.

In FIG. 1, I have depicted only one of a great many attachments, generally designated 23, which may be utilized. Here, the attachment takes the form of a piston for a double acting fluid pressure operated cylinder 24 within which the piston actuator 23 is received. While not in any way critical insofar as the present invention is concerned, the piston 23 is shown as provided with a head portion 23a having a seal mounting groove 25 in which an O-ring sealing member 26 may be received. One end wall of the cylinder may also be provided with an annular groove 27 in which a similar O-ring sealing member 28 may be provided. The cylinder 24 may be provided with fluid inlet and egress ports 24a and 24b in the usual manner.

From the standpoint of the present invention the critical factor is the provision of a sleeve 29 which extends axially from the radial wall 30 provided on the attachment member 23. The sleeve 30 has a bore 31 provided to pass the screw 11 without in any way interacting with it. Exteriorly formed on the sleeve 29 is the projecting helical male thread 32 which conforms exactly, except for assembly tolerances, with the helical groove 15 machined in the nut 14. The thread portions 32, which are separated by land portions 33, accordingly, are of the same pitch and/or lead as the groove 15 and are separated by land portions 33 which are of the same pitch and/or lead as the land portions 16.

In FIG. 3, I have shown a further attachment which may be generally referred to as a ball nut adaptor 35. The attachment 35 has an extending sleeve 29 of the type previously described as having male thread portions 32 and land portions 33. Attachment 35, similarly, has an attachment sleeve 36 with a radial wall 30 adapted to be brought into load bearing engagement with the wall 22 of the nut 14. Provided on the attachment 35, opposite axially from the sleeve 29, is a clevis 37 having an attachment opening 38. The sleeve 36 may be assembled into another attachment, or into a structural member.

THE OPERATION

In assembling the attachment 23 in position, it is only necessary to thread or screw the sleeve 29 into the position shown in FIG. 1 in which the thread portions 32, formed to be received in ball nut groove portions 15, bring the attachment wall 30 into abutting engagement with the end wall 22 of nut portion 21. In this abutting engagement, the surfaces 22 and 30 will be in facial load distributing contact.

When it is the attachment shown in FIG. 1 which is mounted in position, plainly, reciprocating movement of the piston 23, which is fixed against rotation in any suitable manner, is caused by rotary movement of the screw in the usual manner via the train of load bearing balls 17. With the interior surface 31 of the sleeve 29 being axially aligned with the ball circle diameter, there is, of course, no interaction of the sleeve 32 with the screw 11.

When it is the attachment shown in FIG. 3 which is assembled, the screw 11 may be revolved by a suitable motor or source of driving rotation to move the member attached by clevis 37 linearly. In this case, the screw 11 will be fixed against axial movement and the nut 14 will be prevented from rotating.

In either case, the ball screw may be "forward driven" (i.e., by rotating the screw shaft to produce an axial force at the nut/attachment) or "back driven" (i.e., by applying an axial force at the nut/attachment to produce rotation at the screw shaft).

It is to be understood that the embodiments described are exemplary of various forms of the invention only and that the invention is defined in the appended claims which contemplate various modifications within the spirit and scope of the invention.

I claim:

1. In a ball nut and screw assembly (a) an axially extending screw having exterior helical ball carrying groove portions separated by land portions;

(b) a co-axial nut having complemental, helical interior ball carrying groove portions separated by land portions with the same lead as said screw groove and land portions;

(c) an end attachment for said nut having a reduced diameter sleeve extending axially therefrom;

(d) the sleeve having helical exterior thread portions, of the same lead as said nut groove portions, which are of a matching configuration and threaded into one end of said nut, the sleeve having an interior diameter which receives and passes said screw without interacting with it; and (e) a recirculating train of load bearing balls accommodated within said nut and screw groove portions axially spaced from said sleeve.

2. The assembly of claim 1 wherein said nut has a radial end wall, and said end attachment has a radial end wall in abutting load transfer engagement with the end wall of said nut which is maintained in this position by the frictional fit of said sleeve thread and nut groove portions.

3. The assembly of claim 2 wherein said attachment is a piston for a cylinder with an opening in its one end wall for admitting one end of said screw and said piston.

4. The assembly of claim 3 wherein said end attachment is an adaptor having an end axially remote from said sleeve which is in the shape of a clevis.

5. The assembly of claim 1 wherein said sleeve thread portions align axially with the ball circle diameter of the balls in said ball nut and screw groove portions.

6. A method of constructing an axially extending ball nut and screw assembly having: an axially extending screw with exterior helical ball carrying groove portions separated by land portions; a coaxial ball nut having complemental, helical interior ball carrying groove portions separated by land portions with the same lead as said screw groove and land portions; a separate end attachment for said nut having a reduced diameter sleeve extending axially therefrom; the sleeve having helical exterior thread portions which are threaded into one end of said ball nut, the sleeve having an interior diameter which passes said screw without interacting with it; comprising the steps of:

(a) forming a nut with helical ball accommodating groove portions separated by land portions;

(b) dividing said nut axially by providing ball return passages for one end portion of said nut but not for the opposite end portion;

(c) forming a nut end attachment with a reduced diameter sleeve on said end attachment which has helical exterior thread portions of the same lead as said ball nut and screw groove portions; and (d) threading said sleeve into said opposite end portion of said nut.

7. The method of claim 6 wherein said opposite end portion of the ball nut has an end wall, and said attachment has an end wall, which extend radially perpendicular to the axial extent of said ball nut and screw, and these radial walls are brought into load transfer engagement.

8. The method of claim 6 wherein said screw is threaded into said ball nut after said end attachment is assembled.

9. The method of claim 6 wherein said land portions in said opposite end portion of the ball nut are cut back radially to receive said sleeve.

10. The method of claim 9 wherein said thread portions are radially centered on the ball circle diameter of the balls received in said screw and ball nut groove portions.

\* \* \* \* \*